US011938476B2

(12) United States Patent
Wong et al.

(10) Patent No.: US 11,938,476 B2
(45) Date of Patent: Mar. 26, 2024

(54) BIOCHEMICAL ANALYSIS SYSTEM

(71) Applicant: The Penn State Research Foundation, University Park, PA (US)

(72) Inventors: Pak Kin Wong, University Park, PA (US); Tak-Sing Wong, University Park, PA (US); Jing Wang, University Park, PA (US); Hui Li, University Park, PA (US); Yi Lu, University Park, PA (US); Ying Wan, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 17/749,720

(22) Filed: May 20, 2022

(65) Prior Publication Data

US 2022/0274103 A1 Sep. 1, 2022

Related U.S. Application Data

(62) Division of application No. 16/174,008, filed on Oct. 29, 2018, now Pat. No. 11,351,536.

(60) Provisional application No. 62/579,424, filed on Oct. 31, 2017.

(51) Int. Cl.
*B01L 3/00* (2006.01)

(52) U.S. Cl.
CPC ......... *B01L 3/5025* (2013.01); *B01L 3/50273* (2013.01); *B01L 2200/00* (2013.01); *B01L 2300/0816* (2013.01); *B01L 2300/161* (2013.01); *B01L 2300/165* (2013.01); *B01L 2400/0406* (2013.01); *B01L 2400/0481* (2013.01)

(58) Field of Classification Search
CPC .......................... B01L 3/5025; B01L 3/50273
See application file for complete search history.

(56) References Cited

U.S. PATENT DOCUMENTS 8,001,855 B2 8/2011 Tsai
8,614,003 B2 12/2013 Ma et al.
2001/0046453 A1* 11/2001 Weigl ............... B01L 3/502761 422/73

(Continued)

FOREIGN PATENT DOCUMENTS

WO 2014/145528 A1 9/2014

OTHER PUBLICATIONS

You et al., "Fabrication of a Micro-omnifluidic Device by Omniphilic/Omniphobic Patterning on Nanostructured Surfaces," ACS Nano vol. 8, No. 9, 2014, pp. 9016-9024.

(Continued)

*Primary Examiner* — Brian R Gordon
*Assistant Examiner* — Dwan A Gerido
(74) *Attorney, Agent, or Firm* — DINSMORE & SHOHL LLP

(57) ABSTRACT

A biochemical analysis system capable of sample preparation and processing can include at least one inlet channel having a non-fouling, slippery surface to autonomously transport a fluid sample to a chamber by a geometry of the at least one inlet channel. The at least one inlet channel can include a first end, which is open and exposed, and a second end connected to the chamber for mixing and reaction of the fluid sample, and the at least one inlet channel can include a converging or diverging angle.

14 Claims, 13 Drawing Sheets

(56) References Cited

U.S. PATENT DOCUMENTS

| | | | | |
|---|---|---|---|---|
| 2010/0112723 | A1* | 5/2010 | Battrell | B01L 3/502746 422/68.1 |
| 2012/0094397 | A1* | 4/2012 | Horii | G01N 33/54366 422/69 |
| 2014/0220617 | A1* | 8/2014 | Yung | B01L 3/502761 210/695 |
| 2019/0177677 | A1* | 6/2019 | Jonas | C12M 23/16 |

OTHER PUBLICATIONS

Hou et al., "Liquid-based gating mechanism with tunable multiphase selectivity and antifouling behaviour," Nature, vol. 519, Mar. 5, 2015, pp. 70-73.

Wong et al., "Bioinspired self-repairing slippery surfaces with pressure-stable omniphobicity," Nature, vol. 477, Sep. 22, 2011, pp. 443-447.

* cited by examiner

1

BIOCHEMICAL ANALYSIS SYSTEM

CROSS-REFERENCE TO RELATED APPLICATION

This application is a divisional of U.S. application Ser. No. 16/174,008 filed Oct. 29, 2018, which claims the benefit of U.S. Provisional Application No. 62/579,424 filed on Oct. 31, 2017, the disclosures of each of which are hereby incorporated by reference herein in their entirety.

TECHNICAL FIELD

The present disclosure relates to a hand-held, highly reusable biochemical analytical system capable of sample preparation and processing by autonomously transporting a fluid sample to a chamber, which can be specifically designed for medical diagnostics, health condition monitoring, and treatment efficiency evaluation in point of care settings. Such settings include, for example, resource-limited settings or long-duration space flights.

BACKGROUND

Biochemical analysis systems that can perform sufficient sample preparation and analytical functions with minimal use of external energy and high reusability are continually sought for medical diagnostics in regions where resources are limited. Biochemical analysis for health monitoring, disease diagnostics and treatment efficiency evaluation typically require complex procedures and sample preparation steps. Technology that can perform sample preparation and analytical functions with minimal use of external energy and can do so automatically are continually sought for medical diagnostics in non-traditional health care settings, e.g., home, physician office, and transportation infrastructure.

In conventional biochemical analysis system such as lab on a chip, external energy is required to manipulate or transport fluid (either in bulk or in droplet form) from one point to another. Most of the external energy is used to overcome the dissipation forces at the fluid-surface interface. Moreover, biochemical analysis systems with high reusability require special surface treatment that can resist fouling of biological molecules from bodily fluids. Up until now, systems that can satisfy both of these stringent requirements (i.e., minimal energy use and reusability) are rare in the literature and commercial space. Hence a continuing need exists for a biochemical analysis system with high reusability and minimal energy use.

SUMMARY OF THE DISCLOSURE

An advantage of the present disclosure is a biochemical analysis system that can autonomously transport a fluid sample to a chamber for analysis of the fluid sample. The system of the present disclosure can advantageously be a hand-held, highly reusable analytical system capable of sample preparation and processing and even without the use of external power.

According to an aspect of the present disclosure, a biochemical analysis system can include at least one inlet channel having a non-fouling, slippery surface to autonomously transport a fluid sample to a chamber by a geometry of the at least one inlet channel. The at least one inlet channel can include a first end, which is open and exposed, and a second end connected to the chamber for mixing and reaction of the fluid sample, and the at least one inlet channel can include a converging or diverging angle.

According to another aspect of the present disclosure, a biochemical analysis system can include multiple inlet channels each having a non-fouling, slippery surface to autonomously transport a fluid sample to one or more chambers by a geometry of each of the multiple inlet channels. Each of the multiple inlet channels can include a first end, which is open and exposed, and a second end connected to the one or more chambers for mixing and reaction of the fluid sample, and each of the multiple inlet channels can include a converging or diverging angle.

According to still another aspect of the present disclosure, a method of testing a fluid sample for an analyte can include loading either of the above biochemical analysis systems and autonomously transporting the fluid sample to one or more inlet channels to the one or more chambers, in which each of the one or more multiple inlet chambers contain a reactant. Advantageously, the one or more chambers contain a reactant that can react with a potential analyte of interest in the fluid sample and thus the system can readily detect whether such an analyte of interest is present in the fluid sample.

Embodiments of the present disclosure include one or more of the following features individually or combined. For example, the systems of the present disclosure can further comprise a pressure control hole wherein sealing of the pressure control hole allows a predetermined amount of the sample to enter the at least one inlet channel and unsealing of the pressure control hole allows the fluid sample to be autonomously transported to the chamber. In some embodiments, the converging or diverging angle can be an angle between inclined surfaces of the at least one inlet channel. In other embodiments, the converging or diverging angle of the at least one inlet channel can be a predetermined angle such as greater than or equal to about 1°, e.g. ranging from about 1° to about 150°, such as from about 1° to about 60°. In still further embodiments, the converging or diverging angle can be tunable by an external mechanical pressure. Further, the at least one inlet channel can be configured to load a predetermined amount of the fluid sample without an external power source. In other embodiments, the chamber can have a volume of less than about 5 mL and can range from about 10' mL to about 5 mL. The biochemical analysis system can be formed from materials that are readily sterilizable such as comprising glass, silicon, plastic, or an elastomer. In still further embodiments, the biochemical analysis system can be transparent to naked eyes. For example, the channels and chambers can be transparent to the naked eyes so that reaction of the sample fluid with a reactant in the chamber can be readily determined. In addition, the biochemical analysis system can be sterile.

In other embodiments, the non-fouling, slippery surface can have a contact angle hysteresis of less than or equal to about 5 degrees. In some embodiments, the non-fouling, slippery surface can include a smooth chemical binding layer directly on a solid substrate and a layer of lubricant overcoat on the chemical bonding layer and/or the non-fouling, slippery surface can include a single level of roughness on the substrate, a conformal chemical binding layer, and a layer of lubricant overcoat. In other embodiments, the non-fouling, slippery surface can include a dual level of roughness on the substrate, a conformal chemical binding layer, and a layer of lubricant overcoat and/or the non-fouling, slippery surface can include a dual level of roughness on the substrate, a conformal chemical binding layer, and a conformal layer of lubricant. Further, the biochemical analysis system can advantageously include a biosensor and the at least one inlet channel is fluidly connected to the biosensor.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 10A shows a physical model of the channels; FIG. 10B illustrates self-propelled sample transportation; and FIG. 10C illustrates speed of sample liquid transport that can be tuned for a large range of transport times.

FIG. 11A shows a physical model in which a sample droplet can be loaded into reactors by Laplace pressure and surface tension. FIG. 11B illustrates a reactor designed for multi-sample mixing and reactions.

DETAILED DESCRIPTION OF THE DISCLOSURE

Figure 1:
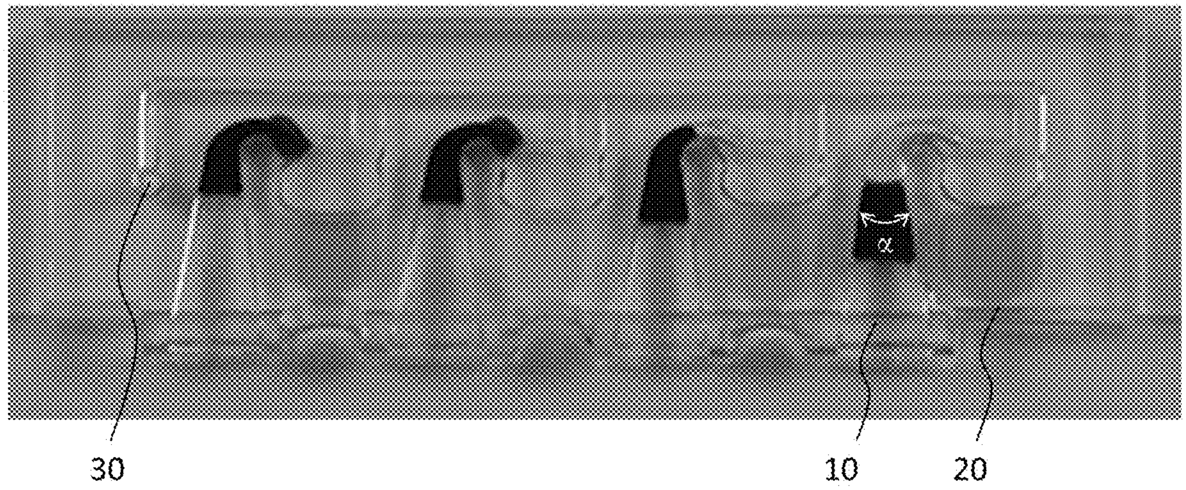
FIG. 1 is a schematic front view illustrating a biochemical analysis system including a converging or diverging inlet channel connected to a reaction chamber according to an embodiment of the present disclosure.

The present disclosure relates to a biochemical analysis system and its use in testing a fluid sample for an analyte. The system includes one or more inlet channels having a non-fouling, slippery surface connected to one or more chambers. A geometry of the one or more channels can form a converging or diverging angle with the chamber which, together with the slippery surface, autonomously transports a fluid sample to the one or more chambers for analysis of the fluid sample. The chambers can include one or more reactants to react with one or more potential analytes of interest in the fluid sample to determine whether the analyte (s) of interest is present in the fluid sample.

Hereinafter, exemplary embodiments in the present disclosure will be described with reference to the accompanying drawings. In the accompanying drawings, shapes, sizes, and the like, of components may be exaggerated or shortened for clarity.

According to an exemplary embodiment of the present disclosure, a biochemical analysis system can be a handheld, reusable analytical system capable of sample preparation and processing. Such a system can be advantageously reusable, reconfigurable, and have zero power consumption. This system can be droplet-based and built on non-fouling, slippery surfaces to autonomously transport a fluid sample to a chamber by a geometry of one or more inlet channels. The slippery surface technology can be a dynamic, molecularly smooth liquid-lubricated interface with relatively low contact angle hysteresis. The implementation of the slippery surfaces in geometrically confined microchannels allows automated droplet manipulation of physiological fluids, such as urine, blood, sweat, saliva, etc., and the droplets can be manipulated with zero power consumption. The non-fouling, ultra-repellent property of the slippery surfaces also enables the system to be reconfigurable and reusable for various biochemical analyses.

By coupling with homogeneous biosensors, the biochemical analysis system is capable of detecting major classes of bioanalytes, including, for example, nucleic acids, proteins, metal ions, organic compounds, inorganic molecules, and pathogens. The versatility of the droplet platform with minimal reagent requirement can facilitate routine and on-demand biochemical analysis of the biomarker and health issues of patients and crewmembers, such as infection, bone loss, vision loss, confused immune systems, dust/radiation/gravity-induced health responses, etc. The ultra-repellent property allows the system to manipulate a wide variety of biological fluids, prevent cross-contamination, and reuse the systems in resource-limited settings.

In certain embodiments, the system is able to perform complex biochemical reactions automatically without external power in resource-limited settings. Liquid samples can be loaded at specified volume and transported into reactors automatically. This design requires no additional instruments, such as pipettes and pumps, which are necessary in typical diagnostics. As the system has ultra-repellent and non-fouling properties, there may be no liquid residue after the loading process. This property enables multistep biochemical reactions with one inlet and reusability of the device. The system can be used for, for example, disease diagnostics, health monitoring, and treatment efficiency evaluation. For instance, the system can be designed for diagnosis of kidney stones. The system can also be designed for urinalysis, which plays a major role in diagnosis of urinary tract infections, metabolic diseases, as well as other biochemical detection applications. With the ability of applying in resource-limited settings, saving money and time on sample transportation and hospital resources, and facilitating real-time monitoring and personal diagnosis, the system can advantageously improve human health.

FIG. 1 is a schematic front view illustrating a biochemical analysis system 1 according to an embodiment of the present disclosure. Hereinafter, the exemplary embodiment of the biochemical analysis system 1 will be labeled a "Slippery Liquid Infused Porous Surface (SLIPS) biochemical analysis system (or SLIPS-LAB)".

As shown in the figure, the SLIPS-LAB 1 can include at least one inlet channel 10 and at least one reaction chamber 20. The inlet channel 10 includes a non-fouling, slippery surface which, together with the geometry of the inlet channel, is capable of autonomously transporting a fluid sample to the chamber 20. The inlet channel 10 has a geometry with a converging or diverging angle (a) defined by inclined surfaces of the inlet channel 10. The inlet channel 10 includes a first end, which is open and exposed, and a second end connected to the chamber 20. The chamber 20 is capable of receiving the fluid sample from the inlet channel and mixing and reacting the fluid sample with a reactant contained in the chamber. By such configurations of the inlet channel 10, the fluid sample can be loaded and autonomously transported to the reaction chamber 20 without using any external power source.

For the exemplary embodiment illustrated in FIG. 1, the biochemical analysis system comprises multiple inlet channels each having a non-fouling, slippery surface to autonomously transport a fluid sample to one or more chambers by a geometry of each of the multiple inlet channels. Each of the multiple inlet channels includes a first end, which is open and exposed, and a second end connected to the one or more chambers for mixing and reaction of the fluid sample. Further each of the multiple inlet channels includes a converging angle, e.g., about 15 degrees, and each of the multiple inlet channels has a non-fouling, slippery surface to autonomously transport a fluid sample to one or more chambers. The biochemical analysis system for this exemplary embodiment also comprises a pressure control hole 30 which is in fluid connection with the multiple chambers and multiple inlet channels. Sealing the pressure control hole allows a predetermined amount of the sample to enter each of the inlet channels and unsealing the pressure control hole allows the received fluid sample to be autonomously transported to the chamber.

The non-fouling, slippery surface of the SLIPS-LAB 1, e.g., the interior surfaces of the inlet channels and interior surfaces of the chamber, can have a contact angle hysteresis, which is less than or equal to about 5 degrees, e.g., less than or equal to about 3 or 2 degrees. For this embodiment, the SLIPS-LAB 1 is made of glass and transparent to naked eyes but the biochemical analysis system can be made of other materials such as silicon, plastic, ceramic or an elastomer material. Further, biochemical analysis systems of the present disclosure, such as SLIPS-LAB 1, can be sterile in order to be used in biochemical and medical fields.

The inlet channel 10 of the SLIPS-LAB 1 can be configured to load a predetermined amount of the fluid sample and autonomously transport the fluid sample to the chamber 20. Preferably, the chamber 20 can have a volume of less than about 5 mL such as ranging from about $10^{-6}$ mL to about 5 mL. In another aspect of the present disclosure, the volume of the chamber 20 can be less than or equal to about 3 mL, or 1 mL or within a range from about $10^{-4}$ mL to 3 mL, e.g., from about 10' mL to about 1 mL. As explained above, the inlet channel 10 of the SLIPS-LAB 1 can load a predetermined amount of the fluid sample by sealing the pressure control hole 30 and dipping the inlet channel in a sample fluid to receive a sample in the inlet channel 10. Unsealing the pressure control hole 30 allows the received fluid sample to be autonomously transported to the chamber 20.

In some implementations of the present disclosure, the inlet channel 10 includes surfaces that form a converging or diverging angle with the channel such as an angle of greater than or equal to about 1° and less than or equal about 150°. For example, converging or diverging angle (a) can be greater than or equal to 2°, 3°, 5° 10°, 15° and less than or equal to about 150°, 120°, 90°, 60°, 50°, 40°, 30°, 20°, and values therebetween. As illustrated in the embodiment of FIG. 1, the inlet channel 10 forms a converging angle of about 15°.

According to an aspect of the present disclosure, the SLIPS-LAB 1 can include a biosensor (not illustrated) and the inlet channel 10 is fluidly connected to the biosensor.

Figure 2A:
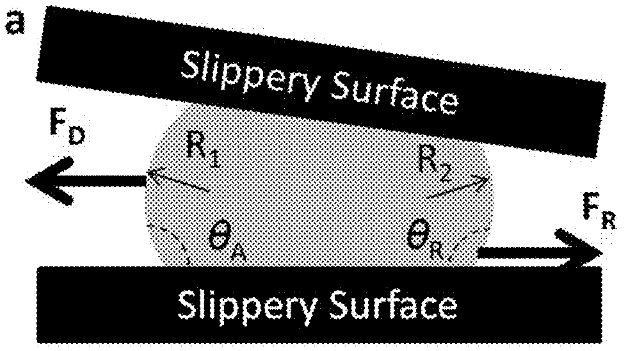
FIG. 2A is a schematic showing a liquid droplet driven by surface force imbalance according to one aspect of the present disclosure.
Figure 2B:
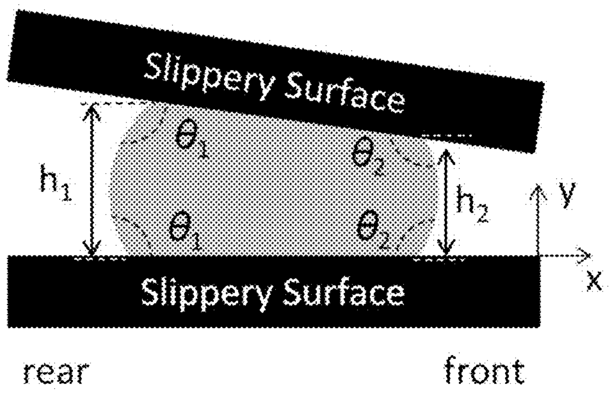
FIG. 2B is a schematic showing a droplet in a channel with confined geometry.

Laplace pressure and surface retention force:

FIGS. 2A and 2B illustrate a mechanism that facilitates autonomous transport of a fluid droplet in a biochemical analysis system of the present disclosure. FIG. 2A is a schematic showing a liquid droplet driven by surface force imbalance according to one aspect of the present disclosure. FIG. 2B is a schematic showing a droplet in a channel with confined geometry.

A biochemical analysis system, e.g., SLIPS-LAB 1, can manipulate droplets in channels by geometrically induced surface force imbalance on non-fouling, slippery surfaces to achieve zero power consumption. As shown in FIGS. 2A and 2B, when a liquid droplet is confined in a converging geometry, there may be two competing forces that can influence the subsequent motion of the droplet. One is the driving force ($F_D$) induced by the difference in Laplace pressure, and the other is the surface retention force ($F_R$) due to the difference in contact angle hysteresis. Specifically, Laplace pressure of a curved fluid-air interface can be calculated as $$\Delta P = \gamma_{LV}\left(\frac{1}{R_1} + \frac{1}{R_2}\right),$$

where $R_1$, $R_2$ are the principal radii of the curved interface, and $\gamma_{LV}$ is the interfacial tension at the air-fluid interface. In addition, the surface retention force can be calculated as $F_R=\gamma_{LV}D(\cos\theta_R-\cos\theta_A)$, where OA and OR are the advancing and receding contact angles, and D is the droplet width.

That contact angle hysteresis can be defined as the difference between the advancing and receding angles (i.e., $\Delta\theta=\theta_A-\theta O_R$). When the driving force caused by the difference in Laplace pressure exceeds that of the surface retention force (i.e., $F_D>F_R$), the droplet will move in the direction of the net force. Therefore, the SLIPS-LAB 1 enables a digital microfluidic platform without external power by creating a surface with negligible contact angle hysteresis (i e, minimizing $F_R$) and controlling the confining geometry of the channels (maximizing $F_D$).

The net force acting on a droplet due to the confined geometry can be expressed as $\Delta F=F_D-F_R$. For the geometry-induced Laplace force, $F_D$ scales as $$\gamma_{LV}\left(\frac{h_1}{\cos\theta_1} - \frac{h_2}{\cos\theta_2}\right),$$

where $h_1$ and $h_2$ are the heights of the channels in the rear and front part of the droplet, respectively, and $\theta_1$ and $\theta_2$ are the contact angles of the rear and front part of the droplet, respectively.

surface retention force. By controlling the channel geometry, one can autonomously dictate the droplet movement direction. Specifically, since the surface retention force will be at its maximum when the contact angle is at 90°, one can choose a lubricant such that the contact angle is either much larger or smaller than 90° in order to reduce the surface retention force. Examples of lubricants that satisfy this criterion are listed in Table 1 as shown below:

TABLE 1

Examples of surface functionalization to create hydrophobic or hydrophilic surface chemistry.

| Solid Substrate | Silane/Chemical Functionalization | Lubricant | θ | Δθ |
|---|---|---|---|---|
| Silicon; glass; polydimethylsiloxane (PDMS); aluminum; titanium | heptadecafluoro-1,1,2,2-tetrahydrodecyltrichlorosilane | tertiary perfluoroalkylamines (such as perfluorotri-npentylamine, FC-70 by 3M; perfluorotri-n-butylamine FC-40, etc.), perfluoroalkylsulfides and perfluoroalkylsulfoxides, perfluoroalkylethers, perfluorocycloethers (like FC-77) and perfluoropolyethers (such as KRYTOX family of lubricants by DuPont), perfluoroalkylphosphines, perfluoroalkylphosphineoxides and their mixtures | 110°-120° | <3° |
| | heptadecafluoro-1,1,2,2-tetrahydrodecyltrichlorosilane; trimethylchlorosilane; dimethyldimethoxysilane, trimethoxymethylsilane, 1H,1H,2H,2H-perfluorodecyltriethoxysilane, grafted PDMS, etc. | Hydride-terminated PDMS | ~110° | <3° |
| | heptadecafluoro-1,1,2,2-tetrahydrodecyltrichlorosilane; trimethylchlorosilane | Mineral oil | ~105° | <5° |
| | heptadecafluoro-1,1,2,2-tetrahydrodecyltrichlorosilane; trimethylchlorosilane; dimethyldimethoxysilane, trimethoxymethylsilane, 1H,1H,2H,2H-perfluorodecyltriethoxysilane, grafted PDMS, etc. | Silicone oil | ~102° | <2° |
| | heptadecafluoro-1,1,2,2-tetrahydrodecyltrichlorosilane; trimethylchlorosilane; dimethyldimethoxysilane, trimethoxymethylsilane, 1H,1H,2H,2H-perfluorodecyltriethoxysilane, grafted PDMS, etc. | Hydroxyl-terminated PDMS | ~75° | <5° |

For Table 1 above, θ represents water contact angle and Δθ represents contact angle hysteresis.

Figure 3A:
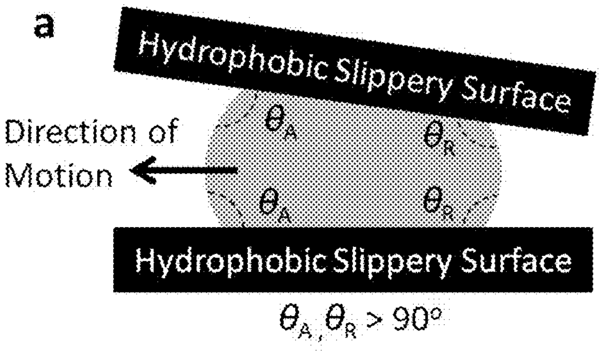
FIGS. 3A and 3B are schematics illustrating droplet motion controlled based on surface hydrophobicity in confined geometry.
Figure 3B:
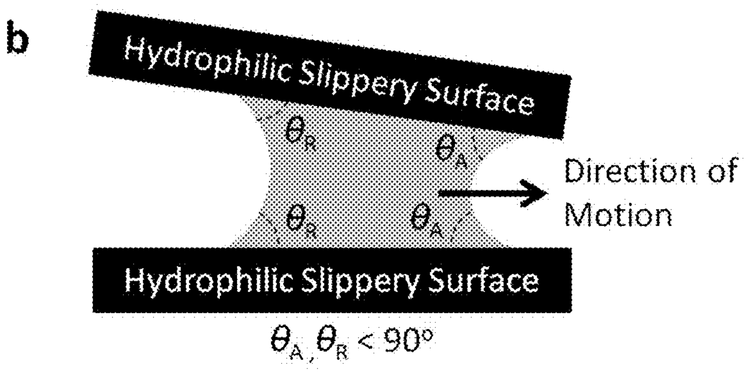

According to an aspect of the present disclosure, the moving direction of the droplet can depend on the repellent characteristics of the channel surface. For example, for a hydrophobic surface with negligible contact angle hysteresis (i.e., $\Delta\theta\approx=0$; $F_R\approx0$), $\theta_1$, $\theta_2>90°$ and $F_D$ is negative (or droplet moving towards the diverging channel direction) when $h_1>h_2$ (see, e.g., FIG. 3A). On the other hand, when the surface is hydrophilic, $\theta_1$, $\theta_2<90°$, and $F_D$ is positive (or droplet moving towards the converging channel direction) when $h_1>h_2$ (see, e.g., FIG. 3B).

Figure 4:
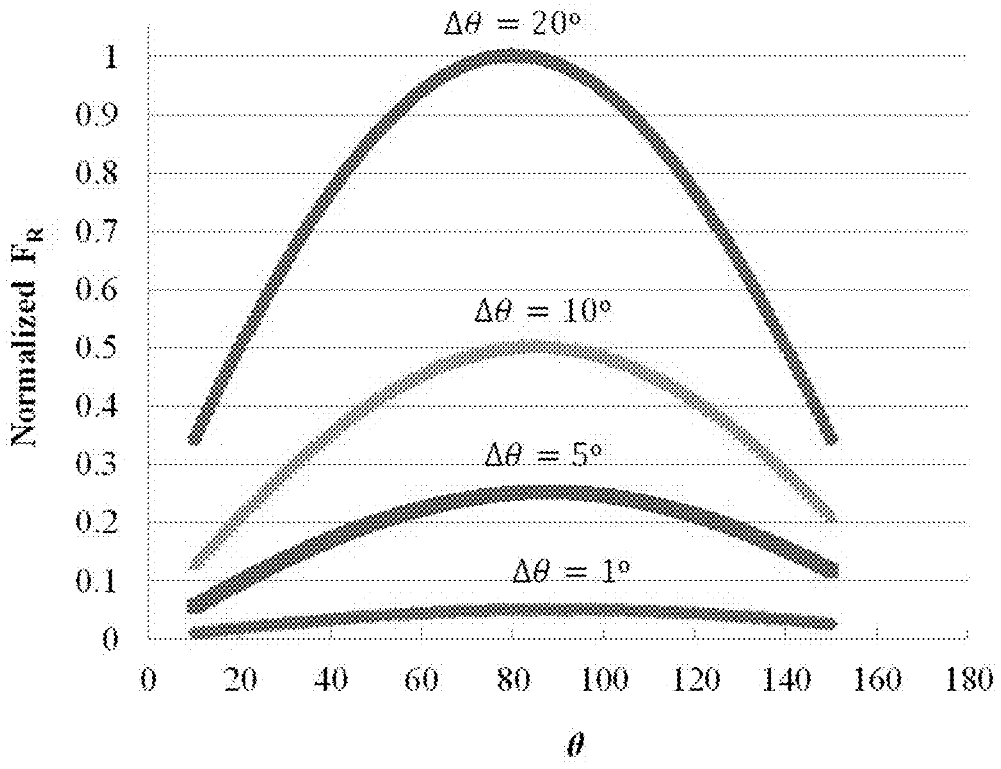
FIG. 4 is a diagram showing dependence of a surface retention force on a contact angle at various contact angle hysteresis.

FIG. 4 is a diagram showing dependence of a surface retention force on a contact angle at various contact angle hysteresis, e.g., Δθ=1°, 5°, 10°, and 20°. Note that, for relative comparison of the magnitudes, the surface retention force data at Δθ=20° are normalized against the maximum Preferably, the non-fouling, slippery surface of biochemical analysis systems according to the present disclosure can have a contact angle hysteresis that is equal to or less than about 5 degrees, such as equal to or less than about 3° or 2°.

Design of Channel and Control of Local Geometry

Figure 5A:
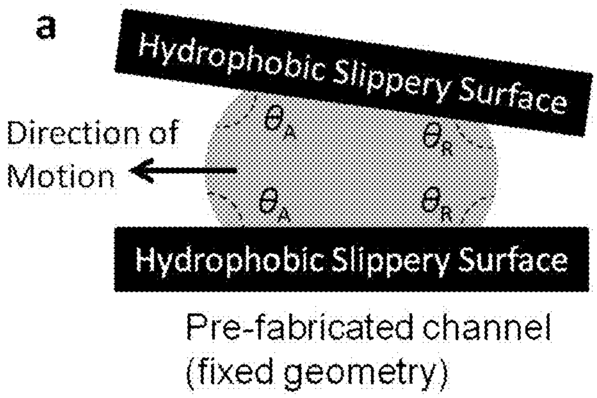
FIGS. 5A and 5B illustrate examples of a channel design according to an aspect of the present disclosure.
Figure 5B:
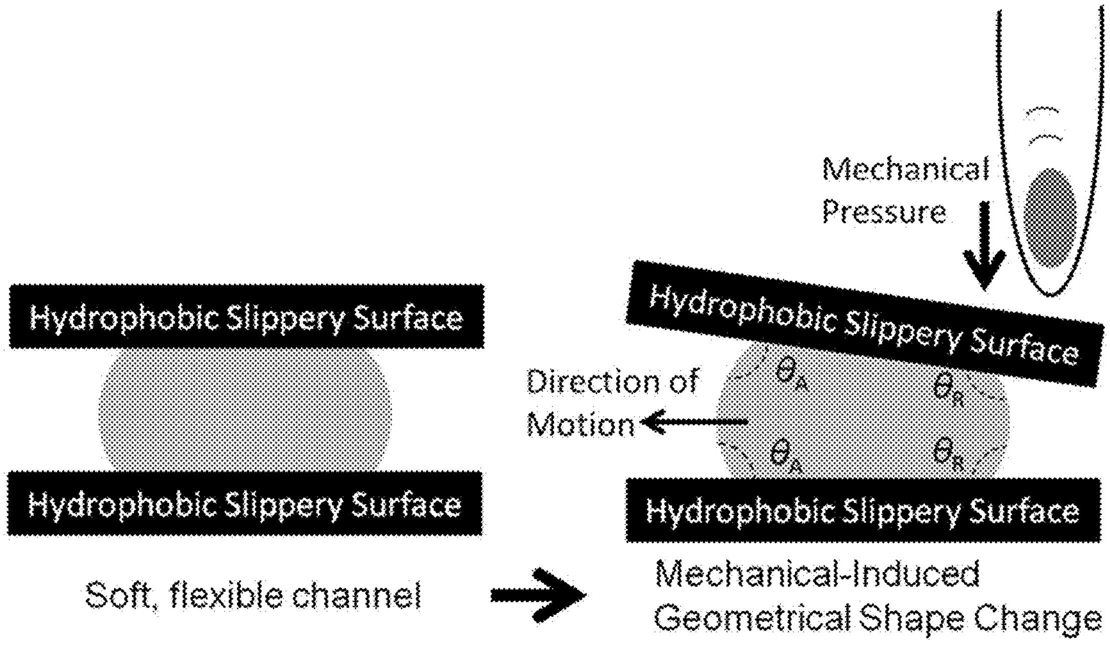

According to an aspect of the present disclosure, the converging or diverging angle (a) of the inlet channel 10 can be tunable by an external mechanical pressure. FIGS. 5A and 5B illustrate examples of a channel design according to an aspect of the present disclosure. FIG. 5A is a schematic showing a fixed geometry in a pre-fabricated channel, and FIG. 5B is a schematic showing a channel made out of flexible materials (e.g., an elastomeric material such as polydimethylsiloxane, etc.) which allow a dynamically tunable channel geometry by an external mechanical pressure.

Figure 6:
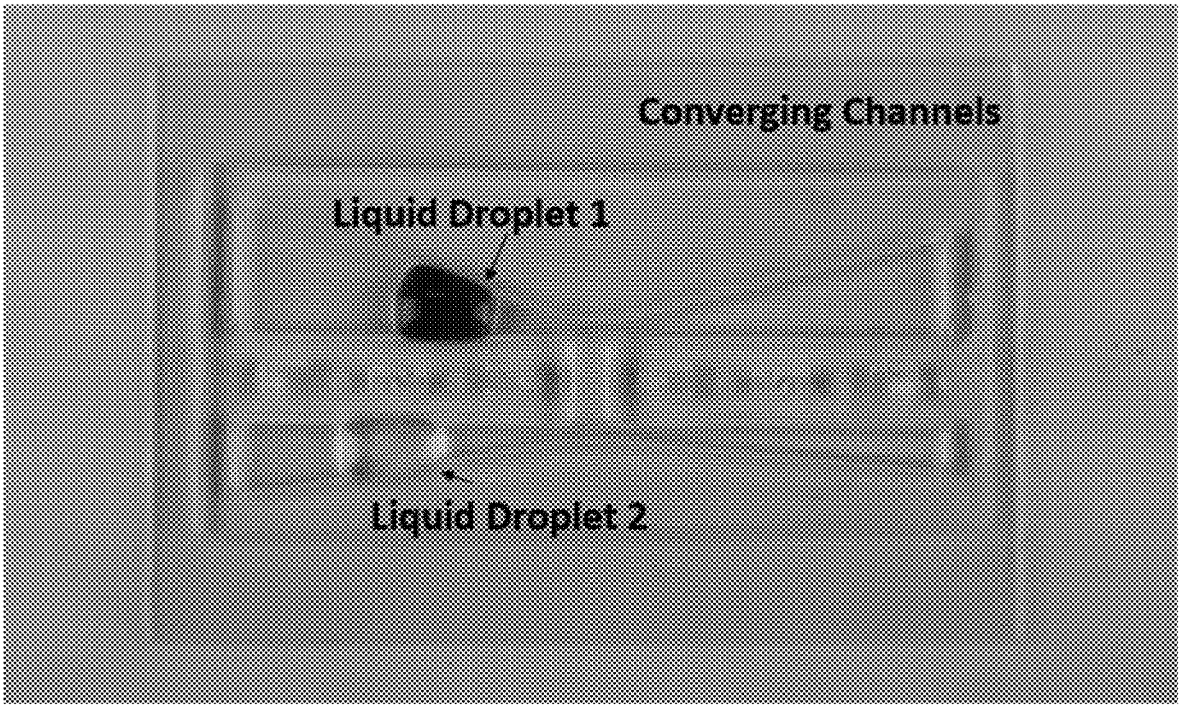
FIG. 6 is an example of a biochemical analysis system, e.g., a SLIPS-LAB design, including converging channels connected to a reaction chamber on a planar surface fabricated using polydimethylsiloxane elastomer.

As shown in FIGS. 5A and 5B, a droplet motion can be controlled by a pre-fabricated channel geometry onto glass, silicon, plastic, or elastomer, as well as using mechanical force to locally induce a change in the geometry within an elastomer channel. An example of the SLIPS-LAB 1 fabricated in the planar surface using polydimethylsiloxane elastomer is shown in FIG. 6. Multiple inlet channels with different converging angles are included to process multiple reagents and control the droplet travel time for reactions with sequential steps.

In order to design appropriate geometries of the channels (e.g., $h_1$ and $h_2$), one can first determine the choice of lubricant based on the water contact angle and contact angle hysteresis (i.e., $\Delta\theta$). Based on the desired working fluid volume, one can determine the corresponding surface retention force of the slippery surface (e.g., FIG. 4). Based on these data and information, one can then calculate the required height differential (i.e., $\Delta h=h_1-h_2$) of the working channel geometries.

Fabrication of the Slippery Surfaces and Surface Design

According to an aspect of the present disclosure, a biochemical analysis system, e.g., SLIPS-LAB 1, can have a coated substrate having a surface including a chemical layer thereon that can maintain a thin lubricant layer thereover to form a slippery coated surface. FIGS. 7A to 7D are schematics showing examples of slippery surface coatings.

Figure 7A:
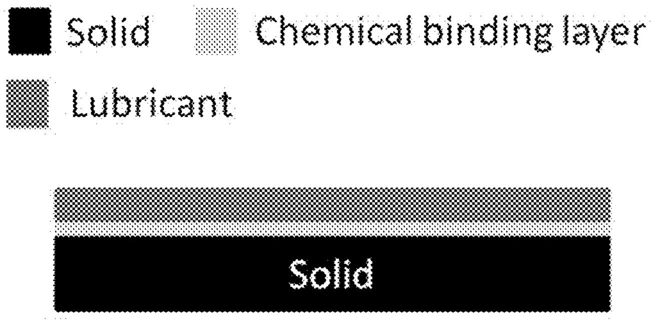
FIGS. 7A, 7B, 7C and 7D are examples of slippery surface coatings.
Figure 7B:
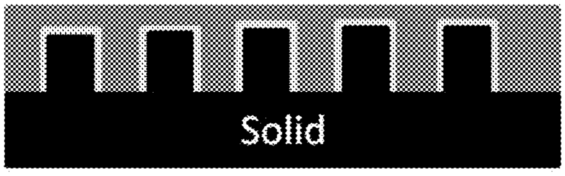
Figure 7C:
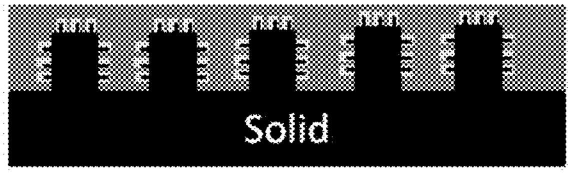
Figure 7D:

These slippery surfaces can be in one or more of the following forms: I) A slippery surface can include a solid substrate and a smooth chemical binding layer and a layer of lubricant overcoat (FIG. 7A). II) A slippery surface can include a single level of roughness, a conformal chemical binding layer, and a layer of lubricant overcoat (FIG. 7B). III) A slippery surface can include a dual level of roughness, a conformal chemical binding layer, and a layer of lubricant overcoat (FIG. 7C). IV) A slippery surface can include a dual level of roughness, a conformal chemical binding layer, and a conformal layer of lubricant. In some cases, the solid substrate may have strong enough chemical affinity towards the lubricant and the chemical binding layer may not be necessary (FIG. 7D).

Some examples of the solid substrate include glass, ceramics, plastics, polymers, elastomers (e.g., polydimethylsiloxane), and metals (e.g., aluminum, titanium, stainless steel).

Some examples of the chemical binding layer include silanes and siloxanes such as, for example, dimethyldimethoxysilane, trimethoxymethylsilane, 1H,1H,2H,2H-perfluorodecyltriethoxysilane, 1H,1H,2H,2H-Perfluorooctanephosphonic acid, 1H,1H,2H,2H-Perfluorododecyltrichlorosilane, 1H,1H,2H,2H-Perfluorodecyltrimethoxysilane, trimethoxy(3,3,3-trifluoropropyl) silane, dimethoxy-methyl(3,3,3-trifluoropropyl)silane, Dimethoxy(methyl)octylsilane, trimethylmethoxysilane, diethoxydimethylsilane, dimethoxymethylvinylsilane, hexamethyldisiloxane, octyldimethylchlorosilane, octamethylcyclotetrasiloxane etc. In one embodiment of the present disclosure, the chemical layer is a polydimethylsiloxane grafted on the surface of the substrate. In some embodiments, the chemical layer can have sub-nanometer height.

A lubricant that is compatible with the chemical bonding layer is then formed over the chemical bonding layer. To form a stable lubrication layer, the lubricant should have a strong affinity to the substrate. In some embodiments, the lubricant can be one or more of an omniphobic lubricant, a hydrophobic lubricant and/or a hydrophilic lubricant. Such lubricants include a perfluorinated oil or a silicone oil or hydroxyl PDMS. For example, perfluorinated oils (e.g. Krytox oil) can form a stable lubrication layer on surfaces modified by silanes and especially perfluorinated silanes. Silicone oil can form a stable layer on surfaces modified by siloxanes such as polydimethylsiloxane (PDMS) or grafted PDMS, for example. Hydroxyl PDMS can form a stable layer on surfaces modified by siloxanes such as PDMS or grafted PDMS, for example. Mineral oils can form a stable layer on surfaces modified by alkyltrichlorosilanes.

Types of Biological Samples

According to an aspect of the present disclosure, a biochemical analysis system can analyze both simple and complex biological samples including but not limited to urine, blood, blood serum, sweat, tear, stool, tracheal aspirate, bronchoalveolar lavage, sebum, saliva, semen, cerebrospinal fluid, lymph, mucus, vomit, gastric juice, pus, semen, vaginal secretion, and bile.

Fluid Manipulation and Biosensing

Mixing of the droplets can be induced by the chaotic mixing induced by a geometry of the inlet channel, passive Marangoni effect or active physical stimulus such as perturbation by fingers, electric field, magnetic field, and heating. Detection of analytes can be detected directly in a sample droplet by using colorimetric, fluorescence, electrochemical or physical methods. Homogeneous assays, including nucleic acid biosensors, aptamer biosensors, nanoparticle biosensors, and enzymatic biosensors, can be applied to detect major classes of bioanalytes, including nucleic acids, proteins, inorganic molecules, and pathogens.

For example, an enzymatic biosensor detects the target substrate by inducing an enzymatic reaction with a colored product. The color change can then be detected by the absorbance.

In another example, the existence of the target molecule induces a conformational change or displacement reaction which results in a detectable signal.

In certain embodiments, a biochemical analysis system is able to achieve accurate sample loading without any accessory. The loading region of a biochemical analysis system is an open-ended channel. When this channel is dipped in liquid samples, the sample volume is accurately tuned by the liquid height and channel dimensions. The channel opening can then be sealed to apply air pressure for reserving the sample in the channel. In addition, biochemical analysis systems according to the present disclosure can eliminate the need for external devices or components to move sample liquids such as pipettes and pumps or magnetic and electric forces to move liquids as used in typical diagnostics and therefore facilitate point of care (POC) diagnosis.

In certain aspects of the present disclosure, biochemical analysis systems have slippery, omniphobic surfaces that are easy to clean. This property minimizes the receding force of the sample movement. Taking advantage of the channel design, Laplace pressure can overcome the receding force on the system. Therefore, the sample can automatically move in the system.

In still further embodiments, the biochemical analysis system is designed to be a standalone, fully automated bioanalytical system. It can be used for detecting biomarkers in physiological samples. The system is designed for routine and on-demand bioanalysis of patients. The development of the biochemical analysis system according to the present disclosure provides analysis (e.g., daily or weekly compared to yearly or even longer in the current standard) for monitoring of the patient's metabolic workup and biomarkers in home settings. Furthermore, the simplicity and speed of the system can eliminate the need for sending samples to a centralized laboratory and provide timely management for patients.

In certain embodiments, a biochemical analysis system, e.g., SLIPS-LAB 1, is prepared by lubricating a rough surface where the lubricating fluid wets the rough surface rather than the sample to be examined. This results in the sample floating on the lubricating fluid. Due to a relatively small contact angle hysteresis between the fluids, the sample can move easily and be kept intact on the surface rather than break-up as the sample flows in the system.

Figure 8:
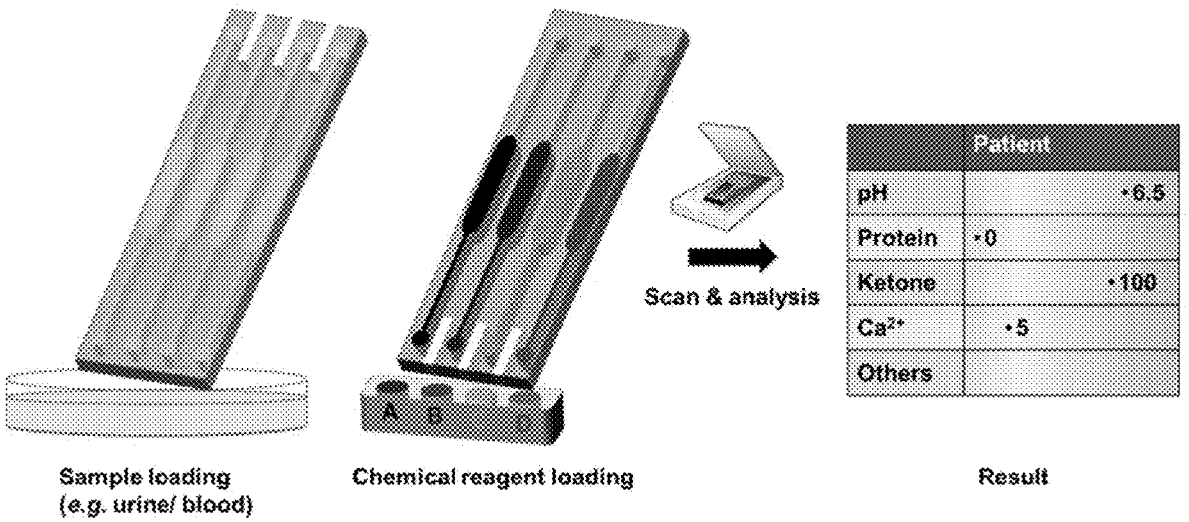
FIG. 8 illustrates an example of a SLIPS-LAB design using capillary action for sample loading.
Figure 9A:
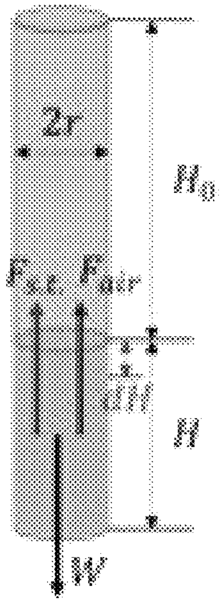
FIGS. 9A and 9B illustrate a physical model built up to show force balance and an experimental result in sample loading.
Figure 9B:
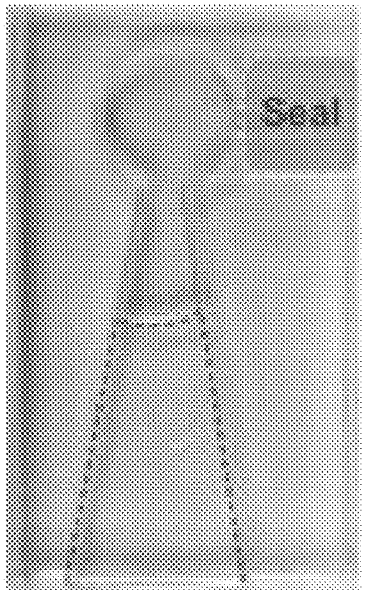

In an implementation of a biochemical analysis system according to an aspect of the present disclosure, a system can be designed to advantageously use capillary action for sample loading. See, e.g., FIG. 8, which illustrates a system designed to operate on capillary action. Similar to the suction process through a straw, an accurate sample loading can be achieved on biochemical analysis systems of the present disclosure FIG. 9A illustrates a physical model built up to show force balance in the above process, and FIG. 9B shows an experimental result. In the equilibrium state, the gravity of the droplet is equal to the sum of surface tension and the air force caused by the pressure difference (Equation 1). The gravity and the surface tension can be readily calculated, whereas the pressure difference can be evaluated based on the ideal gas equation of state (Equation 2). After the model has been built up and the equation has been simplified (Equation 3 indicates a situation where "r" is large; whereas Equation 4 is a situation where "r" is small), it can be demonstrated that the liquid can be loaded at height of 0.94 m. It is sufficient for a biochemical analysis system, e.g. a SLIPS-LAB, which can load samples less than 1 cm in height. The numerical values of these heights are examples of the present disclosure, but not limiting thereto.

$$\rho\pi r^2 Hg = \Delta P\cdot\pi r^2 + \gamma\cdot 2\pi r\cdot\cos\theta \quad \text{(Equation 1)}$$

$$\Delta P = P_{air}\cdot\frac{dH}{H_0 + dH} \quad \text{(Equation 2)}$$

$$H - dH = \frac{\Delta P}{\rho g} \approx 0.94 \text{ m} \quad \text{(Equation 3)}$$

$$H = \frac{2\gamma\cdot\cos\theta}{\rho g\tau} \approx 0.14 \text{ m} \quad \text{(Equation 4)}$$

$$F_{Leading} = \frac{2\gamma\cdot\cos(\theta+\phi_1)}{R_1}\cdot 4\pi R_1^2\cdot\alpha_1 - \frac{2\gamma\cdot\cos(\theta+\phi_2)}{R_2}\cdot 4\pi R_2^2\cdot\alpha_2 \quad \text{(Equation 5)}$$

$$F_{Receding} = f_c\cdot \text{mg} = \tan\beta\cdot\text{mg} \quad \text{(Equation 6)}$$

Figure 10A:
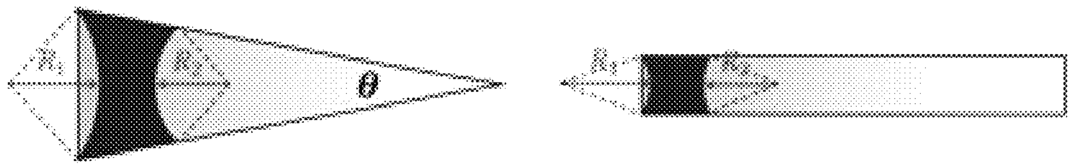
FIGS. 10A to 10C illustrate designs for autonomous transport of a fluid sample on non-fouling, slippery surfaces.
Figure 10B:
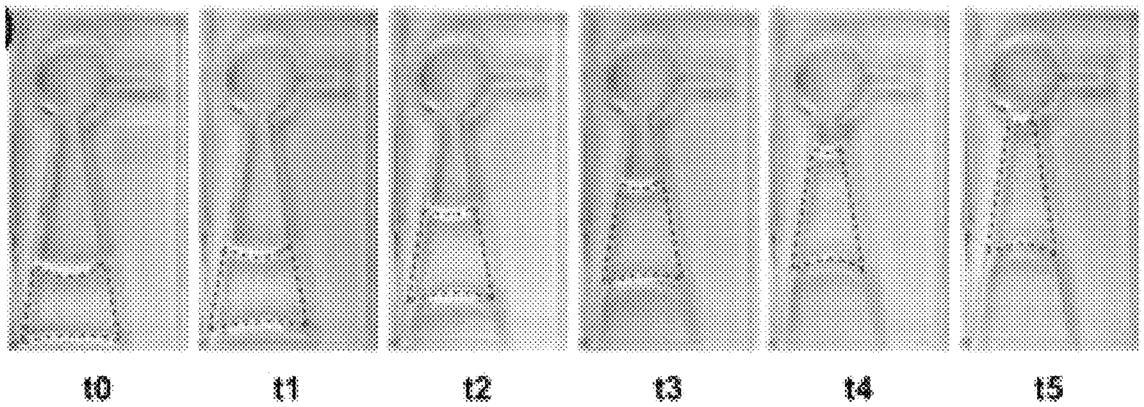

For this embodiment, SLIPS-LAB 1 can be designed to perform self-propelled sample transportation. As shown in FIG. 10A, the self-propelled transportation has been driven through the asymmetrical Laplace pressure on the sample. The leading force is the force due to Laplace pressure difference on the asymmetrical ends of the sample (Equation 5), whereas the receding force is calculated as the friction between the sample and the channel (Equation 6). In this case, the leading force is 259 μN, and the receding force is 44 μN. Therefore, the sample will be driven through the channel as a result of this force differential, and the experimental result can be found in FIG. 10B showing locations of a sample within a channel of SLIPS-LAB 1 at different time points t0 to t5. The numerical values of these forces are examples of the present disclosure, but not limiting thereto.

Figure 10C:
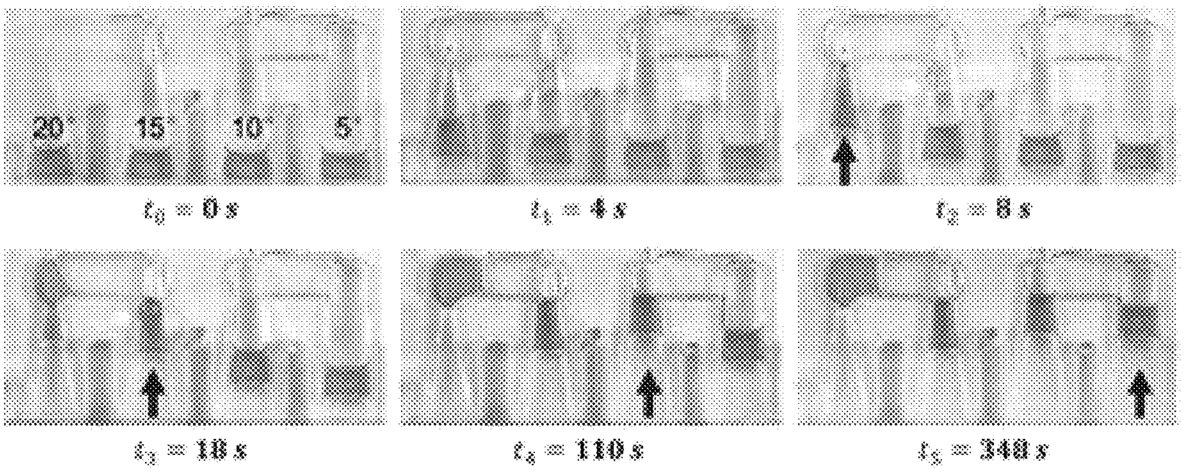

FIG. 10C shows that the speed of the movement of a sample droplet can be tuned in a large range through the radius on the asymmetrical ends, which can be achieved by changing the converging angle of the channel. With different moving speeds, the samples can be loaded to the following reactors at specified times. This design can facilitate multi-step biochemical reactions.

Figure 11A:
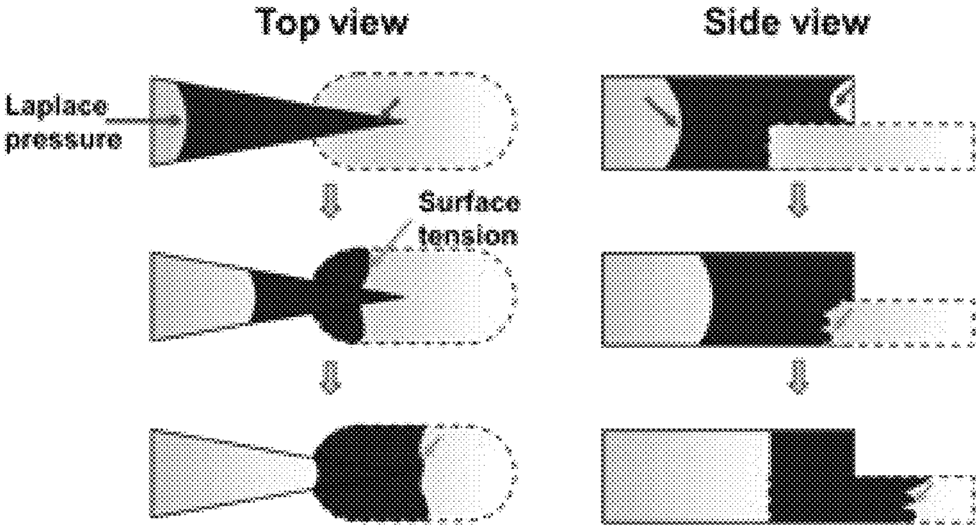
FIGS. 11A and 11B are schematics showing sample mixing and reaction on a biochemical analysis system including inlet channels having a non-fouling, slippery surface to autonomously transport a fluid sample to a chamber.
Figure 11B:
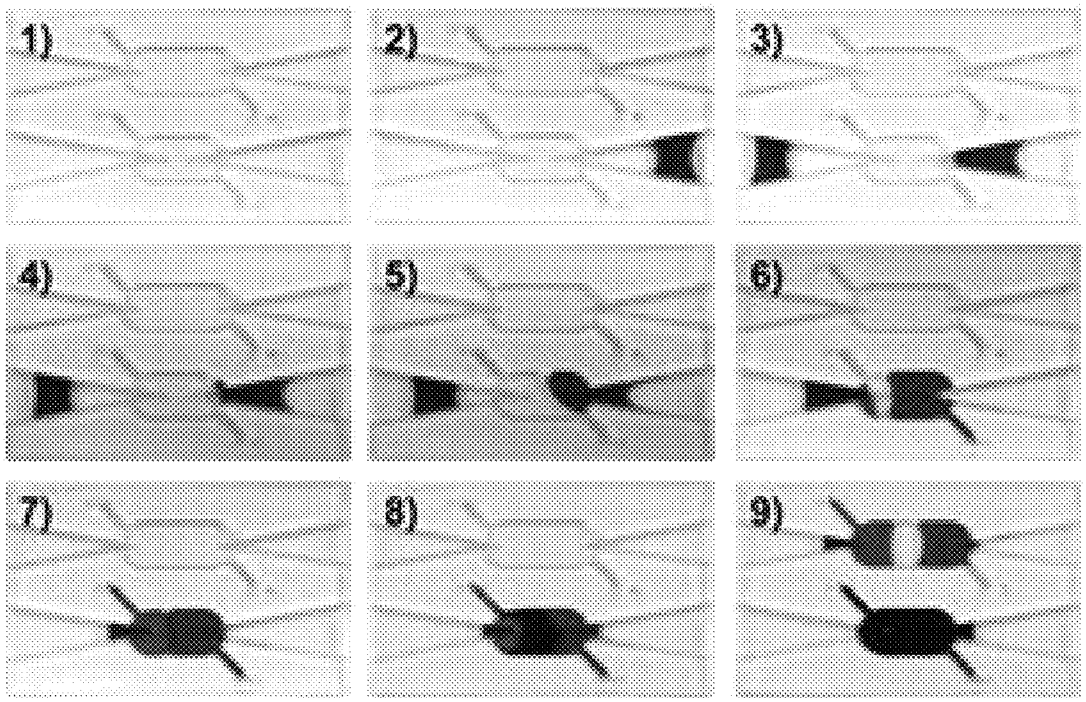

In an embodiment, one or more channels of a biochemical analysis system can be designed to lead one or more samples into one or more reactors for automatic chemical reactions (see, e.g., FIGS. 11A and 11B). The top channel is triangular in shape, whereas the bottom channel is connected with the reactor without the top tip. First, the leading force is from the Laplace pressure difference on the droplet. In this case, the leading force increases when the sample goes into the top channel. Due to this leading force, the sample will be led into the reactor from the top triangle channel. The loaded sample on top will lead sample in from the bottom. As the sample contacts the bottom surface, sample will be further spread inside the reactor owing to surface tension. Because surface tension is relatively large, sample can be loaded inside rapidly. This design helps the sample to move from the sharp channel to the wide reactor. It is noted that it is possible to integrate multiple samples within one reactor, which is critical for reactions that require multiple steps and multiple reagents.

FIG. 11B illustrates a reactor designed for multi sample mixing and reactions. As discussed above, the samples can be loaded one by one. In some instances, a lubricating fluid membrane tends to develop between adjacent samples. This membrane is due to the accumulated lubricating fluid at the smaller entrance of the reactor. It is more energetically favorable for the sample to spread through the boundary of the reactor rather than overcome the lubricating fluid surface tension. Therefore, the individual sample, surrounded with lubricating fluid, can enter the reactor, and the lubricating fluid membrane remains between adjacent samples. This meniscus membrane can be compressed and penetrated by adjacent samples in the middle region. It results in the adjacent samples coming into contact. The samples can then mix due to diffusion. After the mixing and reaction, the result on a biochemical analysis system can be examined using a scanner. In some aspects of the present disclosure, the biochemical analysis system is sized to fit in a scanner.

Referring to FIG. 11B, the biochemical analysis system can be demonstrated using food dyes. Herein, the food dye solutions are preloaded in a multiwell array chip. The channels on the biochemical analysis system extend in wells on the chip. With a sealed pressure control hole, different samples in the wells can be simultaneously loaded to corresponding channels on the system. The sample volume can be tuned by the entrance of the channels. The system is then set flat, and the pressure control hole is released. The samples are automatically transported from the entrance towards the reactors. In this case, it takes less than 10 seconds for the loading process with 15° angle channels. The samples can be led into the reactors because of the geometric structure at the interface between the channels and the reactors. The leading samples in the reactors gradually spread and guide the whole droplet into the reactors. Another sample is loaded in all reactors following above procedure. Importantly, droplets surrounded in the lubricating fluid mix after overcoming the oil-membrane barrier. The latter droplet finally diffuses towards the former one. For real diagnosis, the result can be examined after the reactions.

The fabrication of a biochemical analysis system of the present disclosure is not limited. Any design using our initial working principle for sample loading, sample transportation, sample mixing, reaction and/or examination can be employed. For instance, the substrate, inlet channels and chambers can be any material designed for reserving the lubricating fluid, such as other porous materials, rough materials, fabric materials and/or the combination of these materials. The lubricating fluid can be any material preferring to remain with the substrate, inlet channels and chambers rather than the sample, such as silicone oil, etc. The substrate, inlet channels and chambers can be fabricated from porous materials (e.g., porous polymer, porous metal, porous semiconductor materials, porous dielectric materials, etc.), roughened materials (e.g., patterned/roughened semiconductor, patterned/roughened glass, patterned/roughened metal, patterned/roughened polymer, etc.), or fabric materials (e.g., nylon, cotton, stretchable electronic fabric, biodegradable fabric, etc.)

Figure 12:
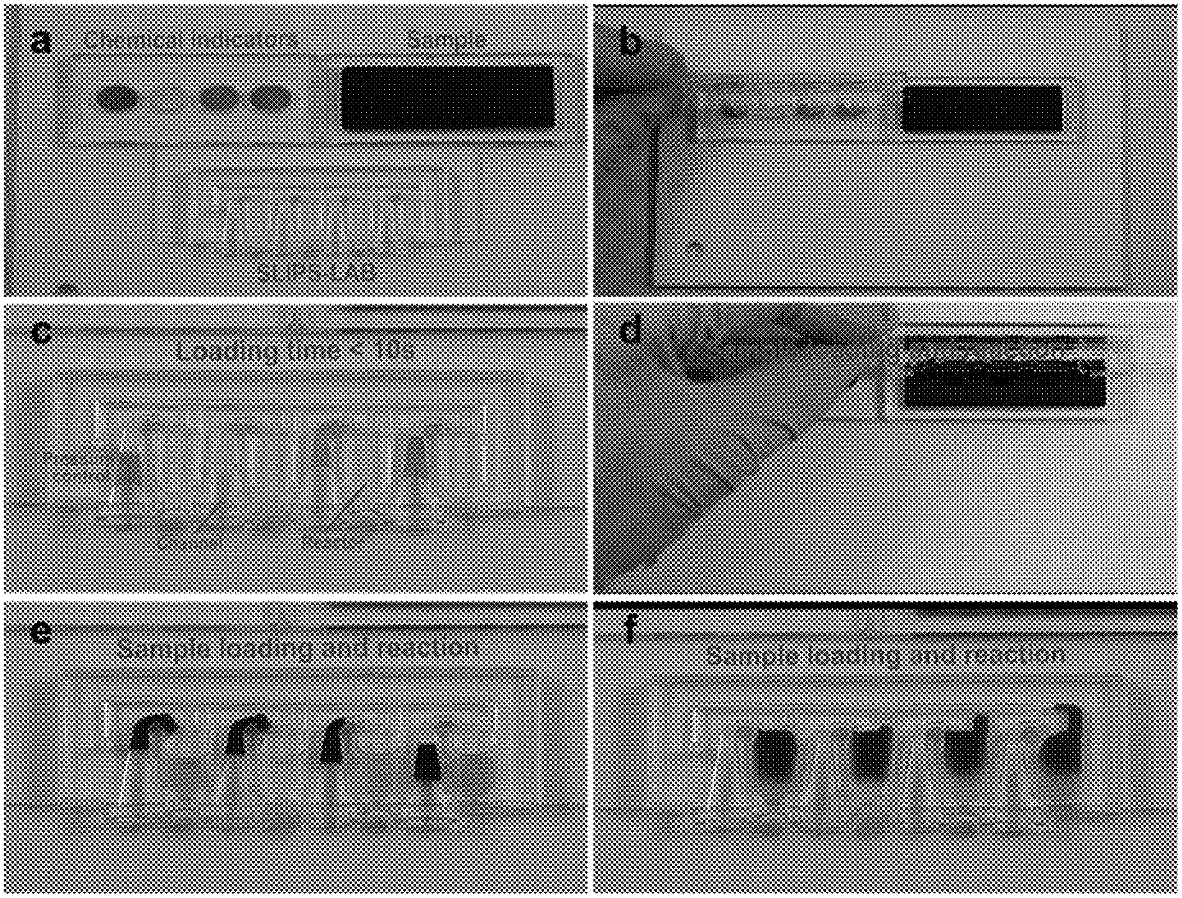
FIG. 12 illustrates steps of an operation process using a biochemical analysis system according to an embodiment of the present disclosure.

The process of testing a fluid sample for an analyte using a biochemical analysis system of the present disclosure is not limited. According to another exemplary embodiment of the present disclosure, FIG. 12 illustrates steps of an operation process using a biochemical analysis system comprising multiple inlet channels connected to multiple chambers (e.g., a biochemical analysis system described for FIG. 1). As shown in FIG. 12A, the biochemical analysis system can be a standalone, biochemical analysis platform that does not require external power or supporting equipment. Reagent loading is performed by simply dipping the system into the reagents wells while sealing a pressure control hole to receive a predetermined amount of each reagent in each inlet channel (FIG. 12B). Reagents can be loaded into the reaction chambers automatically due to the geometry of the inlet channel, e.g., a converging angle, and slippery interior surfaces with the unsealing of the pressure control hole (FIG. 12C). Sample can analogously be loaded and transported to the chamber. For example, a sample can be loaded by dipping the biochemical analysis system into the sample (e.g., urine, etc.) while sealing a pressure control hole to receive a predetermined amount of sample in each inlet channel (FIG. 12D). Samples can be autonomously transported into each chamber preloaded with reagent by unsealing of the pressure control hole (FIG. 12E). Reactions between an analyte of interest in the sample and the reagent preloaded in chambers can then take place in the chambers (FIG. 12F). Such reactions can be determined by optical readouts such as absorbance, reflectance, or fluorescence, by scanner, cell phone, or other optical readers as well as electrochemical readouts with electrodes and electronic interfaces.

EXAMPLES

A biochemical analysis system comprising multiple inlet channels connected to each of the multiple reaction chambers was fabricated with a design similar to that shown for FIG. 1. The system was made of acrylic and has interior inlet channel and chamber surfaces made from polydimethylsiloxane (PDMS) with lubricating oil to provide a non-fouling, slippery coating. A urine sample was loaded in each chamber. The chambers were then loaded with a solution containing reagents for detecting calcium, citrate, urate, protein, and oxalate analytes in a sample, respectively (see Table 2 below). The analytes were determined in the sample by a scanner or a cellphone camera. The following table (Table 3) shows the concentrations of the analytes in the sample determined by the biochemical analysis system (System) and compared to measurement using a standard 96 well plate with manual processing (Standard) and the error between the two.

TABLE 2

Metabolic panel for kidney stone diagnosis

| Analytes | Normal range | Value per day | Reaction/Purpose |
|---|---|---|---|
| pH | 4.5-8 | 5.5-6.3 | Colorimetric indicator |
| Calcium | 5-17.5 mg/dL | 250(M)/200(F) mg/day | O-CPC + 8-Hydroxyquinoline → Complex |
| Citrate | 15-40 mg/dL | 450(M)/550(F) mg/day | Oxaloacetate → pyruvate |
| Urate | 12.5-40 mg/dL | 800(M)/750(F) mg/day | Urate + 2 $H_20$ + $0_2$ $\xrightarrow{\text{Uricase}}$ Allantoin + $H_20_2$ + $CO_2$<br>$H_20_2$ + ADHP $\xrightarrow{\text{HRP}}$ Resorufin + 2 $H_20$ |
| Oxalate | 1-2.5 mg/dL | 40 mg/day | Oxalate decarboxylase → Formate<br>Formate dehydrogenease → PMS-H + INT → Reduced-INT |

TABLE 3

Concentrations of the analytes

| Analyte | System (x, mg/dL) | Standard (y, mg/dL) | Error $\left(\frac{x-y}{y}\right)$ |
|---|---|---|---|
| $Ca^{2+}$ | 14 | 13 | 8% |
| Uric acid | 83 | 84 | −1% |
| Citrate | 15 | 14 | 7% |
| Oxalate | 7.8 | 7.5 | 4% |
| pH | 8.2 | 8.0 | 2% |

As shown by the table above, a biochemical analysis system according to the present disclosure can readily determine analytes of interest in a biological sample with relatively high accuracy and without the need for supporting equipment and intensive labor processing steps.

Figure 13:
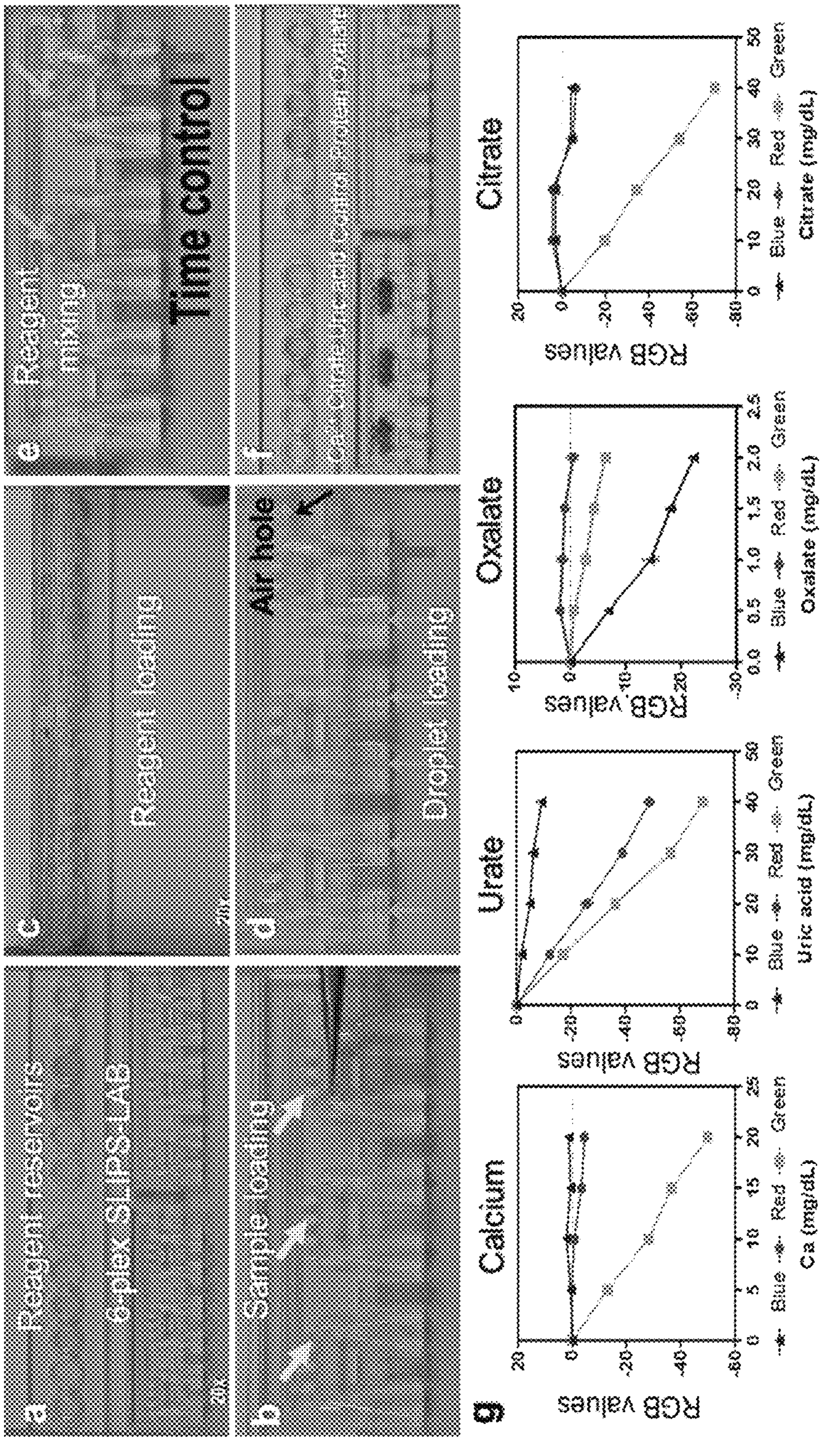
FIG. 13 illustrates steps in a demonstration of droplet manipulation and assay development using a biochemical analysis system to detect urinary analytes.

Exemplary steps of a biochemical analytic experiment using a biochemical analysis system, e.g., a SLIPS-LAB, can be as follows. The biochemical analysis system can include six modules for multiplex detection of five established urinary stone analytes (calcium, citrate, uric acid, pH, and oxalate) and a control. Samples are loaded and trapped into the top sample inlets using a cotton swab by capillary force (FIG. 13*b*). Colorimetric and enzymatic reagents are loaded from the bottom inlets by dipping the biochemical analysis system into the reservoirs and sealing the air hole (FIG. 13*c*). The reagents are trapped in the channel by air pressure. Droplet loading was initiated by opening the air hole. The reaction droplets are loaded automatically into the chambers and mixed with the sample (FIGS. 13*d-e*). For reactions that require multiple steps and reaction time control, the channel is designed to generate a slow-moving droplet (FIGS. 13*d-e*, large arrow, far right). The multiplex assays are completed automatically and the results can be detected using a cellphone camera or a desktop scanner to quantify the colorimetric readout (FIG. 130. The results show the biochemical analysis system can detect major urinary stone analytes (FIG. 13*g*).

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A method of testing a fluid droplet sample for an analyte, the method comprising the steps of:

providing a biochemical analysis system comprising multiple inlet channels and one or more chambers for mixing and reaction of the fluid droplet sample, each of the multiple inlet channels having a non-fouling, slippery surface, each of the multiple inlet channels including a first end, which is open and exposed, and a second end connected to the one or more chambers, each of the multiple inlet channels tapering from one of the first and second ends to the other of the first and second ends at a converging or diverging angle;

loading the biochemical analysis system with the fluid droplet sample;

autonomously transporting the fluid droplet sample to the one or more chambers by a geometry of each of the multiple inlet channels and without any external power source including pipettes, pumps, and magnetic and electric forces; and detecting whether the analyte is present in the fluid droplet sample.

2. The method according to claim 1, wherein the converging or diverging angle is a predetermined angle between inclined surfaces of each of the multiple inlet channels, the predetermined angle ranging from 1° to 150°.

3. The method according to claim 1, further comprising changing the converging or diverging angle by an external mechanical pressure.

4. The method according to claim 1, wherein loading the fluid droplet sample comprises loading the fluid droplet sample without an external power source, and the one or more chambers has a volume ranging from $10^{-6}$ mL to 5 mL.

5. The method according to claim 1, wherein the biochemical analysis system comprises glass, silicon, plastic, or an elastomer.

6. The method according to claim 1, wherein the biochemical analysis system is transparent to naked eyes.

7. The method according to claim 1, wherein the biochemical analysis system is sterile.

8. The method according to claim 1, wherein the non-fouling, slippery surface has a contact angle hysteresis of less than or equal to 5 degrees.

9. The method according to claim 1, wherein each non-fouling, slippery surface includes a smooth chemical binding layer directly on a solid substrate and a layer of lubricant overcoat on the chemical bonding layer.

10. The method according to claim 1, wherein each non-fouling, slippery surface includes a single level of roughness on a substrate, a conformal chemical binding layer, and a layer of lubricant overcoat.

11. The method according to claim 1, wherein each non-fouling, slippery surface includes a dual level of roughness on a substrate, a conformal chemical binding layer, and a layer of lubricant overcoat.

12. The method according to claim 1, wherein the biochemical analysis system further comprises a pressure control hole, the method further comprising sealing the pressure control hole allowing the predetermined amount of the fluid sample to enter the at least one of the multiple inlet channels and unsealing the pressure control hole allowing the fluid sample to be autonomously transported to the one or more chambers.

13. The method according to claim 1, wherein the biochemical analysis system includes a biosensor and the at least one of the multiple inlet channels is fluidly connected to the biosensor.

14. The method according to claim 1, wherein the one or more chambers contain a reactant.

* * * * *